United States Patent

Alary et al.

[11] Patent Number: 5,937,653
[45] Date of Patent: Aug. 17, 1999

[54] REDUCED POLLUTION COMBUSTION CHAMBER HAVING AN ANNULAR FUEL INJECTOR

[75] Inventors: Jean-Paul Daniel Alary, Paris; Stéphane Jean-Marie Courtet, Melun; Michel André Albert Desaulty, Vert Saint Denis, all of France

[73] Assignee: Societe Nationale D'Etude et de Construction de Moteurs D'Aviation (SNECMA), Paris, France

[21] Appl. No.: 08/884,668

[22] Filed: Jun. 27, 1997

[30] Foreign Application Priority Data

Jul. 11, 1996 [FR] France .................................. 96 08656

[51] Int. Cl.⁶ ...................................................... F02C 3/06
[52] U.S. Cl. ............................ 60/748; 60/39.36; 60/737; 60/740
[58] Field of Search .................................. 60/39.36, 737, 60/740, 746, 748

[56] References Cited

U.S. PATENT DOCUMENTS

| | | |
|---|---|---|
| 2,552,851 | 5/1951 | Gist, Jr. . |
| 2,920,449 | 1/1960 | Johnson . |
| 3,736,746 | 6/1973 | DuBell et al. ............................ 60/737 |
| 4,158,959 | 6/1979 | Reider . |
| 5,331,805 | 7/1994 | Myers et al. ........................... 60/39.36 |
| 5,619,855 | 4/1997 | Burrus ..................................... 60/737 |

FOREIGN PATENT DOCUMENTS

| | | |
|---|---|---|
| 0 059 490 | 3/1981 | European Pat. Off. . |
| 2 698 157 | 5/1994 | France . |
| 2057672 | 4/1981 | United Kingdom . |
| 2098719 | 11/1982 | United Kingdom . |
| 2211596 | 7/1989 | United Kingdom . |
| 2252152 | 7/1992 | United Kingdom . |

*Primary Examiner*—Charles G. Freay
*Attorney, Agent, or Firm*—Bacon & Thomas, PLLC

[57] ABSTRACT

An annular combustion chamber is disclosed for use in a gas turbine engine, the combustion chamber having an axis of symmetry, an inner annular wall, an outer annular wall, and a forward end extending between the inner and outer wall to form boundaries for the combustion chamber. The forward end of the combustion chamber has an inner ring member extending about the axis of symmetry and an outer ring member extending about the axis of symmetry and radially spaced from the inner ring member, the inner and outer ring members forming inner and outer boundaries of an annular chamber that diverges in a rearward direction. The inner and outer ring members are interconnected by a plurality of circumferentially spaced apart spacers so as to form a plurality of arcuate openings between adjacent spacers. A plurality of fuel injector assemblies are associated with the forward end of the combustion chamber, each fuel injector assembly comprising an arcuate injection manifold located in an arcuate member, in turn, located in one of the plurality of arcuate openings so as to divide the arcuate opening into an inner annular space and an outer annular space, the injection manifold having an inner array of injection orifices to inject fuel into the inner annular space, and an outer array of injection orifices to inject fuel into the outer annular space. The inner and outer ring members have a plurality of air swirlers located forwardly of the fuel injection orifices to direct air flows into the inner and outer annular spaces in counter-rotation directions around the axis of symmetry. The injection orifices are oriented so as to direct fuel into the inner and outer annular spaces generally in the same direction as the air flow in the respective annular space.

7 Claims, 3 Drawing Sheets

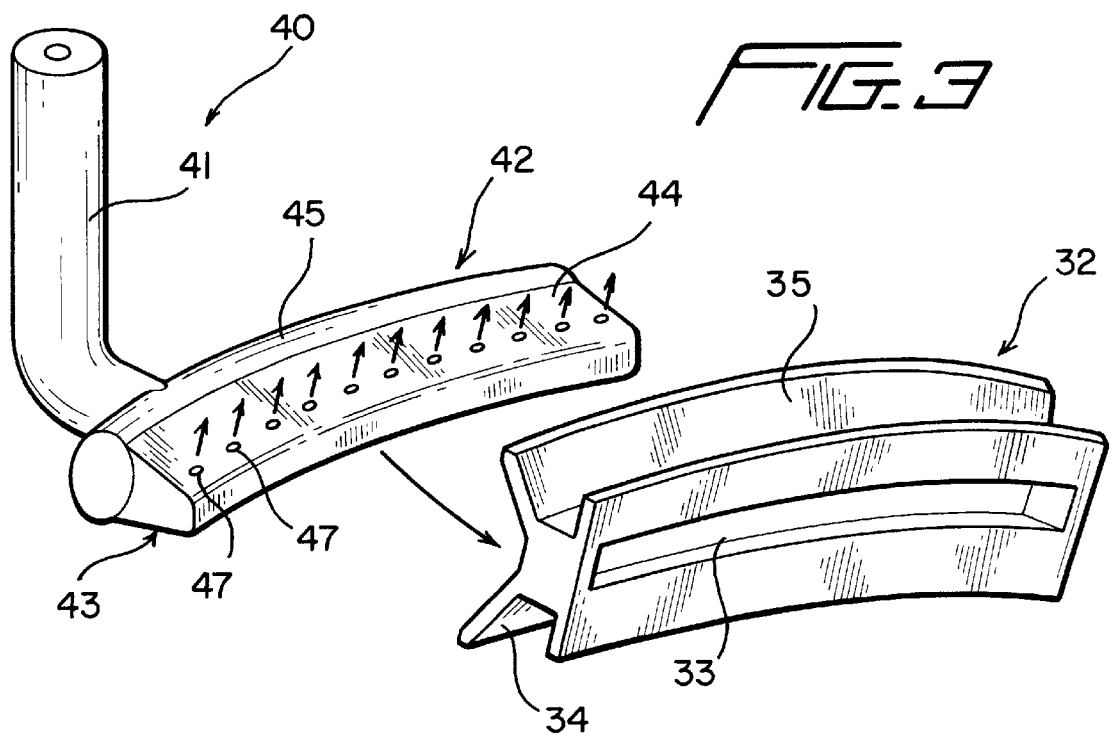
FIG. 3
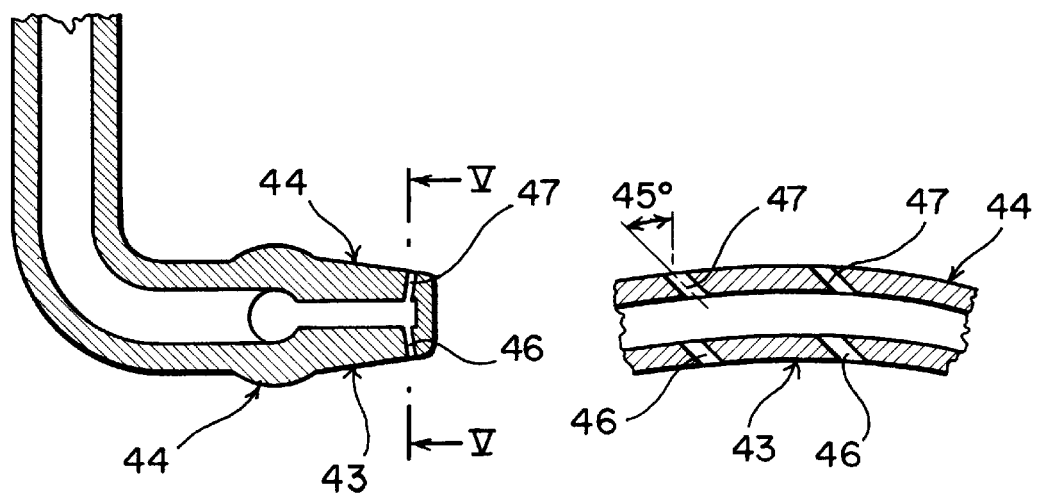
FIG. 4
FIG. 5

REDUCED POLLUTION COMBUSTION CHAMBER HAVING AN ANNULAR FUEL INJECTOR

BACKGROUND OF THE INVENTION

The present invention relates to a combustion chamber for a turbojet engine, more particularly such a combustion chamber having an annular fuel injector to reduce pollutants from the engine.

Gas turbine engines having annular combustion chambers are well known in the art, particularly such engines utilized on aircraft, and conventionally comprise air and fuel injecting systems located in the forward portion of the combustion chamber. Such known fuel injection systems comprise feeder bowls circumferentially arrayed around an axis of symmetry at the front end of the combustion chamber, wherein each feeder bowl comprises a fuel injector, a swirler for the fuel atomizing air and an array of holes to inject air into the atomized fuel cone. Such feeder bowls are typically circular in configuration and the number of such fuel injectors around the annular combustion chamber is rather substantial.

While generally successful, the known structures have a "dead" zone between each bowl within the combustion chamber resulting in a circumferential temperature profile that is non-homogeneous. Such "dead" zones generate nitrogen oxides ($NO_x$) in the engine exhaust gases.

U.S. Pat. No. 2,920,449 discloses an annular combustion chamber wherein the forward chamber end comprises an annular opening bounded by two, spaced apart cylindrical walls, the air axially entering the chamber through the opening. An injection manifold comprising two rings having radial orifices is mounted in the annular opening and a diverging annulus is located rearwardly of the injection manifold to separate the combustion gases issuing from the combustion zone of the combustion chamber into two annular flows, one directed at the inner wall, the other directed at the outer wall.

French Patent No. 2,698,157 discloses a combustion chamber having an injection system utilizing feed bowls having an elliptical configuration. This design reduces the number of injectors necessary and improves the homogeneity of the circumferential temperature profile.

SUMMARY OF THE INVENTION

An annular combustion chamber is disclosed for use in a gas turbine engine, the combustion chamber having an axis of symmetry, an inner annular wall, an outer annular wall, and a forward end extending between the inner and outer wall to form boundaries for the combustion chamber. The forward end of the combustion chamber has an inner ring member extending about the axis of symmetry and an outer ring member extending about the axis of symmetry and radially spaced from the inner ring member, the inner and outer ring members forming inner and outer boundaries of an annular chamber that diverges in a rearward direction. The inner and outer ring members are interconnected by a plurality of circumferentially spaced apart spacers so as to form a plurality of arcuate openings between adjacent spacers. A plurality of fuel injector assemblies are associated with the forward end of the combustion chamber, each fuel injector assembly comprising an arcuate injection manifold located in an arcuate member, in turn, located in one of the plurality of arcuate openings so as to divide the arcuate opening into an inner annular space and an outer annular space, the injection manifold having an inner array of injection orifices to inject fuel into the inner annular space, and an outer array of injection orifices to inject fuel into the outer annular space. The inner and outer ring members have a plurality of air swirlers located forwardly of the fuel injection orifices to direct air flows into the inner and outer annul spaces in counter-rotation directions around the axis of symmetry. The injection orifices are oriented so as to direct fuel into the inner and outer annular spaces generally in the same direction as the air flow in the respective annular space.

The use of such an annular combustion chamber structure achieves near perfect fuel homogeneity in a circumferential direction around the axis of symmetry, thereby decreasing the $NO_x$ emissions and, improving the temperature profile, while at the same time reducing the number of parts from the known prior art devices.

The arrays of fuel injection orifices are located in inner and outer surfaces of the injection manifold which surfaces converge toward each other in a rearward direction. The axes of the fuel injection orifices in each of the inner and outer arrays are oriented at an angle of between 40° and 50° with respect to a radius line extending from the axis of symmetry. The converging surfaces extend from a toroidal portion of the injection manifold having a dimension in the radial direction substantially the same as the radial dimension of an associated arcuate aperture in the arcuate member.

The arcuate member has forwardly extending portions which diverge from each other in a forward direction to facilitate the assembly of the fuel injection manifold. The inner and outer ring members may also comprise a plurality of oxidizer, or air injection orifices located to the rear of the injection manifold.

BRIEF DESCRIPTION OF THE DRAWINGS

FIG. 3 is a partial, exploded view of the fuel injector according to the present invention.

FIG. 4 is a cross-sectional view of the fuel injection manifold illustrated in FIG. 3.

FIG. 5 is a partial, cross-sectional view taken along line V—V in FIG. 4.

FIG. 6 is a partial, cross-sectional view taken along VI—VI in FIG. 1.

DETAILED DESCRIPTION OF THE PREFERRED EMBODIMENT

Figure 1:
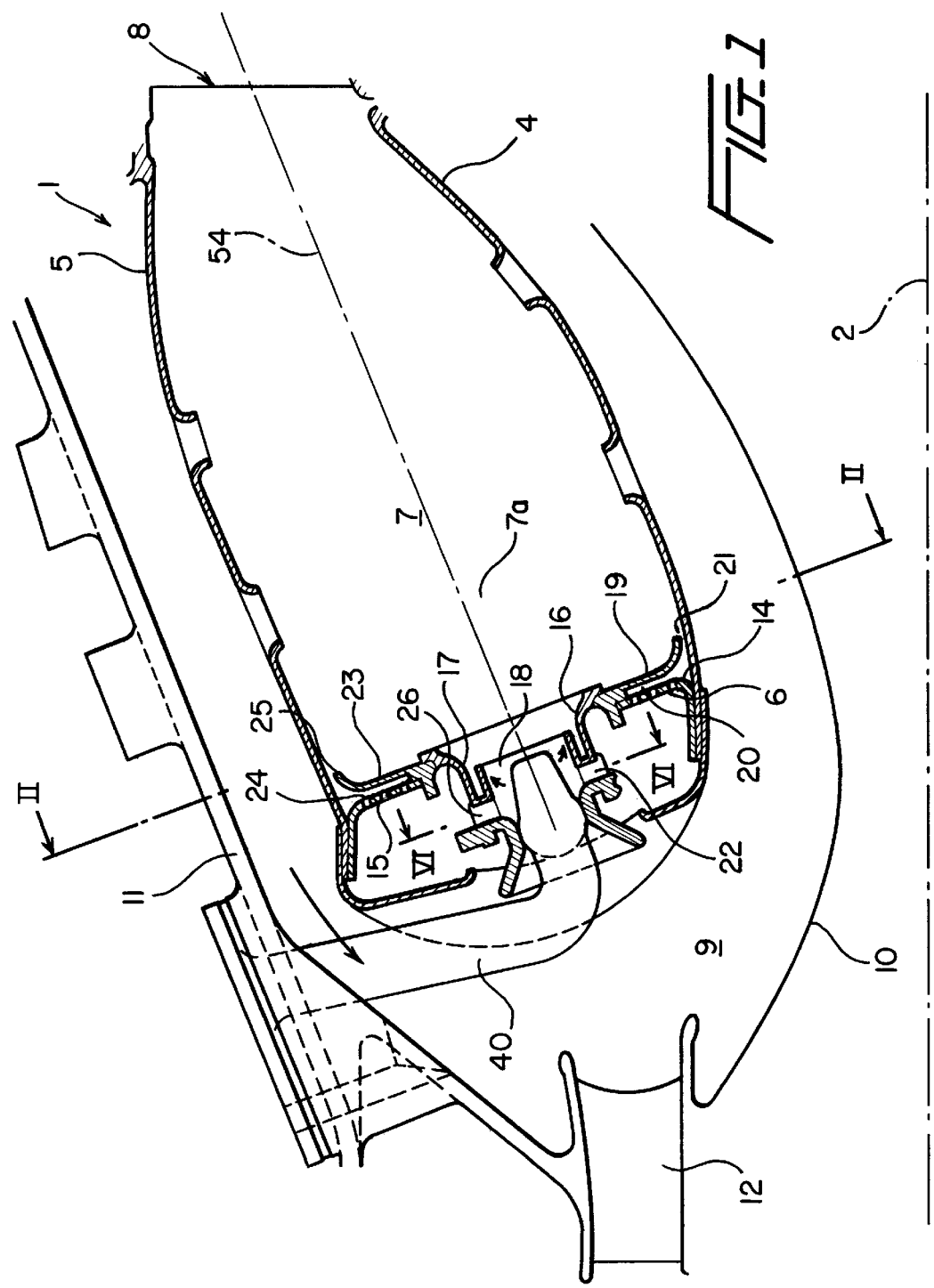
FIG. 1 is a partial, cross-sectional view of a combustion chamber according to the present invention.

The combustion chamber assembly 1 according to the present invention is illustrated in FIG. 1, and has an axis of symmetry 2 about which the combustion chamber assembly 1 extends so as to form an annular combustion chamber 7. Combustion chamber 7 is bounded by an inner annular wall 4, an outer annular wall 5, radially spaced outwardly from the inner annular wall 4, and a forward end 6. These elements bound the combustion chamber 7 which has a combustion zone 7a and an annular exhaust opening 8 through which the burnt gases are evacuated toward a gas turbine (not shown) in known fashion. The combustion chamber assembly 1 is housed in a casing 9 comprising an inner annular casing wall 10 and an outer annular casing wall 11. The casing 9 is supplied with an oxidizer, typically compressed air, through a diffuser 12 by a compressor (not shown) turned by the turbine (not shown) in known fashion.

The combustion chamber end 6 extends substantially transverse to the axis of symmetry 2 and comprises inner annular plate 14 affixed to and extending from the inner annular wall 4, and an outer annular plate 15, affixed to and extending from the outer annular wall 5. The inner and outer annular plates 14 and 15 extend towards each other. Chamber end 6 also comprises inner ring member 16 and outer ring member 17 which bound between them an annular chamber 18 which diverges in a rearward direction and which is located forwardly of the combustion zone 7a of the combustion chamber 7.

The inner ring member 16 is affixed to the inner annular plate 14 and has thermal shield portion 19 extending radially inwardly generally parallel to the annular plate 14. Annular plate 14 has cooling air intake orifices 20 enabling cooling air to pass through the annular plate 14 and through the annular slot 21 between the thermal shield 19 and the inner wall 4. An inner radial swirler 22 is also located in the inner ring member 16.

Outer ring member 17 is affixed to an inner edge of the annular plate 15 and has thermal shield 23 extending radially outwardly and generally parallel to the annular plate 15. Plate 15 has a plurality of orifices 24 through which passes cooling air which subsequently flows through the slot 25 between the thermal shield 23 and the outer annular wall 5. A plurality of outer, radial swirlers 26 are located at the forward end of the outer ring member 17.

Figure 2:
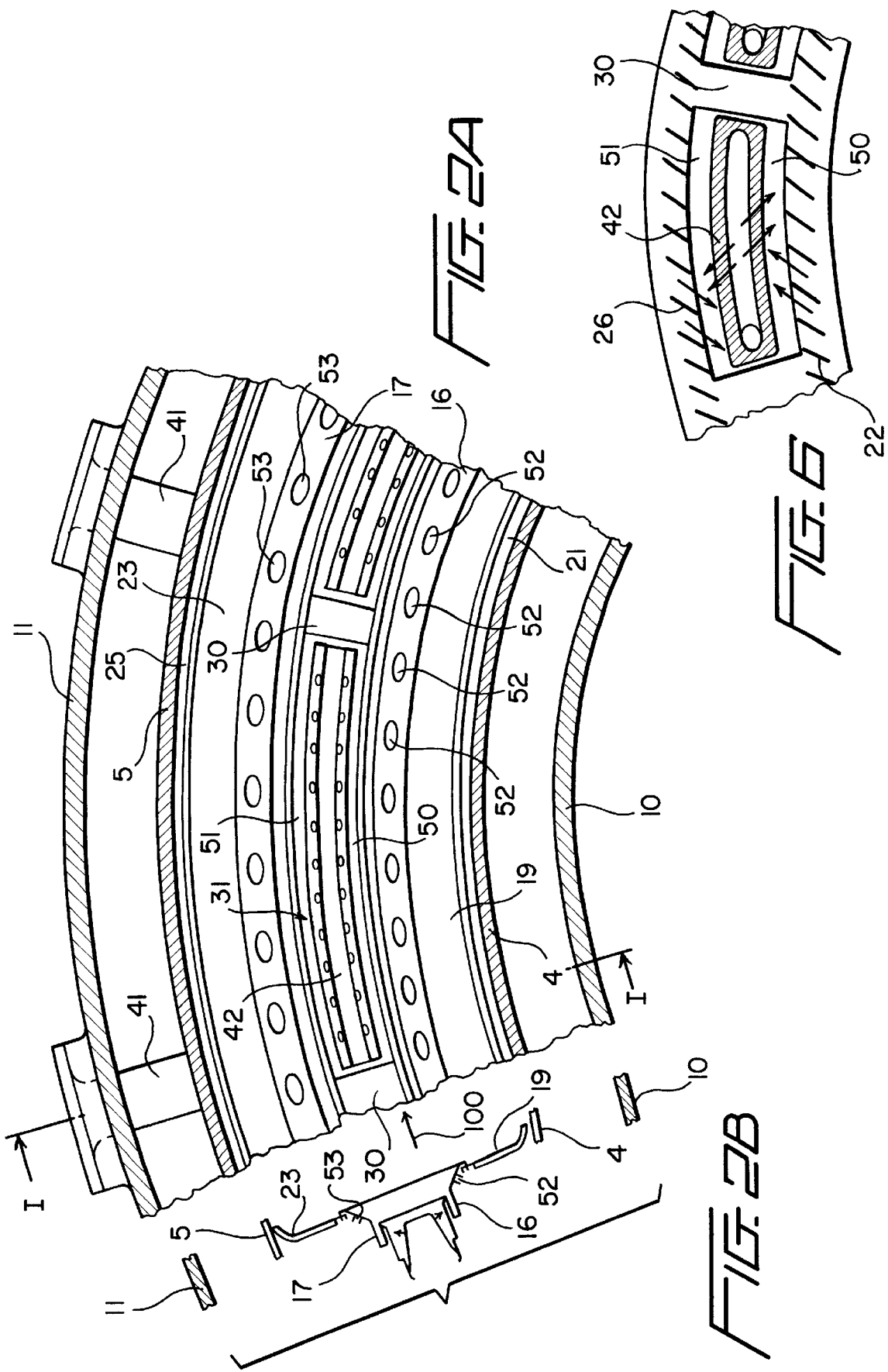
FIG. 2A is a cross-sectional view taken along line II—II in FIG. 1.
FIG. 2B is an end view of the structure illustrated in FIG. 2 viewed in the direction of arrow 100.

As best seen in FIG. 2, inner and outer ring members 16 and 17 are radially spaced apart and are connected, at forward portions, by a plurality of radially extending spacers 30, circumferentially equidistantly spaced around the axis of symmetry 2. Arcuate openings 31 are bounded by the ring members 16 and 17, as well as by adjacent radial spacers.

An arcuate member 32 having an arcuate aperture 33 is located forwardly of the inner and outer ring members 16 and 17 such that the arcuate aperture 33 communicates with the arcuate opening 31. The arcuate member 32 is located circumferentially between two adjacent spacers 30. Arcuate members 32 comprise diverging guide walls 34 and 35 which diverge away from each other in a forward direction located at the forward opening of the arcuate aperture 33 and are mounted to the end 6 of the combustion chamber with radial and axial clearances so as to allow relative thermal expansion between the various components.

The fuel injection system comprises fuel injector assemblies 40 which are the same in number as the number of arcuate openings 31 in the end 6 of the combustion chamber assembly 1. Each fuel injector assembly 40 comprises a generally radially extending injector tube 41 and an arcuate injection manifold 42 located in an arcuate aperture 33 of an arcuate member 32. Each injection manifold 42 comprises inner and outer surfaces 43 and 44 which converge toward each other in a rearward direction and which extend rearwardly from a toroidal portion 45 which, in turn, is connected to the injector tube 41. The dimension of the toroidal portion in a direction generally transverse to the axis of symmetry 2 is approximately equal to the corresponding dimension of the arcuate aperture 33.

The inner and outer surfaces 43 and 44 each have an array of fuel injection orifices 46 and 47, respectively, which have axes oriented at an angle between 40° and 50° in a circumferential direction from a radius line extending from the central axis 54 of the combustion chamber.

The assembly of the injection manifold 42 into an arcuate aperture 33 is facilitated by the presence of the diverging guide walls 34 and 35 and by the arcuate member 32 being mounted with clearance onto the combustion chamber end 6.

When viewed from the inside of the combustion chamber, as illustrated in FIG. 2, the set of arcuate injection manifolds 42 form a discontinuous annular manifold partitioning the annular chamber 18 into an inner annular space 50, bounded is by the inner ring member 16 and the manifold surface 43, and an outer annular space 51 bounded by outer ring member 17 and outer manifold surface 44. The inner annular space 50 is supplied with fuel through the array of fuel injection orifices 46 and with atomizing air through the inner swirler 22. The outer annular space 51 is supplied with fuel through the outer array of orifices 44 and with atomizing air through the outer swirler 26.

Inner and outer air swirlers 22 and 26 are, respectively, mounted such that they generate air flows in the inner and outer annular spaces 50 and 51 which rotate in opposite directions around the axis of symmetry 2. As illustrated in FIG. 6, the air entering the annular space 50 swirls in a generally clockwise direction, while air entering the outer annular space 51 swirls in a generally counter-clockwise direction. It is to be understood, however, that these directions are for the purposes explanation and air could swirl in the opposite directions without exceeding the scope of this invention.

The orifices of the fuel injection orifice arrays 46 and 47 also circumferentially slope in such a manner that they inject fuel into the respective annular spaces 50 and 51 in generally the same circumferential direction as the direction of flow in the respective annular space.

Rearward diverging portions of the inner and outer ring members 16 and 17 may further comprise air injection orifices 52 and 53, respectively, to inject air into the fuel/air mixture emanating from annular spaces 50 and 51.

The foregoing description is provided for illustrative purposes only and should not be construed as in any way limiting this invention, the scope of which is defined solely by the appended claims.

We claim:

1. An annular combustion chamber for a gas turbine engine, the combustion chamber having an axis of symmetry, an inner annular wall, an outer annular wall, and a forward end extending between the inner and outer walls to bound the combustion chamber, the inner and outer walls having rear portions forming an exhaust outlet, the forward end of the combustion chamber comprising:

a) an inner ring member extending about the axis of symmetry and an outer ring member extending about the axis of symmetry and spaced from the inner ring member, the inner and outer ring members forming inner and outer boundaries of an annular chamber that diverges in a rearward direction, the inner and outer ring members interconnected by a plurality of circumferentially spaced apart spacers to form a plurality of arcuate openings therebetween;

b) a plurality of fuel injector assemblies, each fuel injector assembly comprising an arcuate injection manifold located in one of the plurality of arcuate openings so as to divide the arcuate opening into an inner annular space and an outer annular space, the injection manifold having an inner array of injection orifices to inject fuel into the inner annular space, and an outer array of injection orifices to inject fuel into the outer annular space; and, c) a plurality of air swirlers in the inner and outer ring members located forwardly of the inner and outer arrays of fuel injection orifices, respectively, to direct air flows into the inner and outer annular spaces in counter-rotating directions around the axis of symmetry, whereby the injection orifices in the inner and outer arrays are oriented so as to direct fuel into the inner and outer annular spaces generally in the same direction as the air flow in the respective annular space.

2. The combustion chamber of claim 1 wherein the axes of the injection orifices in the inner and outer arrays are oriented at between 40° and 50° in a circumferential direction to a radius extending from the axis of symmetry.

3. The combustion chamber of claim 1 wherein the fuel injection manifold comprises inner and outer surfaces converging toward each other in a rearward direction, the inner and outer arrays of injection orifices being located in the converging inner and outer surfaces respectively.

4. The combustion chamber of claim 3 wherein the converging inner and outer surfaces extend rearwardly from a toroidal manifold portion.

5. The combustion chamber of claim 4 further comprising a plurality of arcuate members, each arcuate member located adjacent to the arcuate opening and forming an arcuate aperture communicating with the associated arcuate opening, and having forward portions diverging from each other in a forward direction.

6. The combustion chamber of claim 5 wherein the dimension of the toroidal manifold portion along a radius from the axis of symmetry is approximately equal to a corresponding dimension of the associated arcuate aperture.

7. The combustion chamber of claim 1 wherein the inner and outer ring members each have a plurality of oxidizer injection orifices located rearwardly of the injection manifold.

\* \* \* \* \*